Patented Dec. 8, 1925.

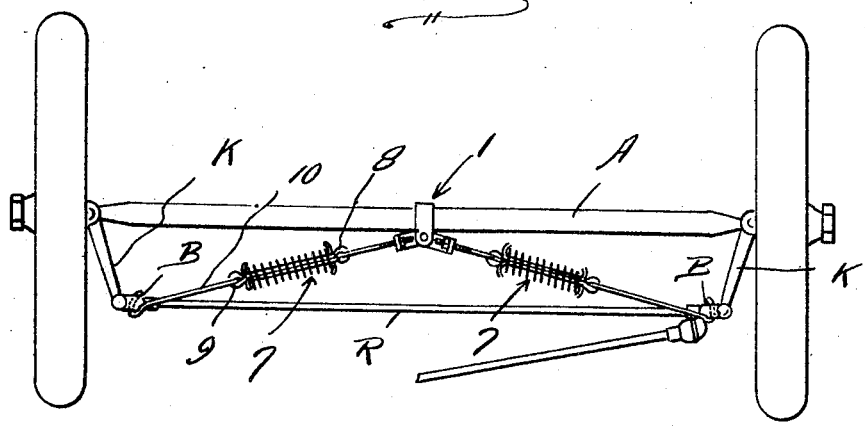
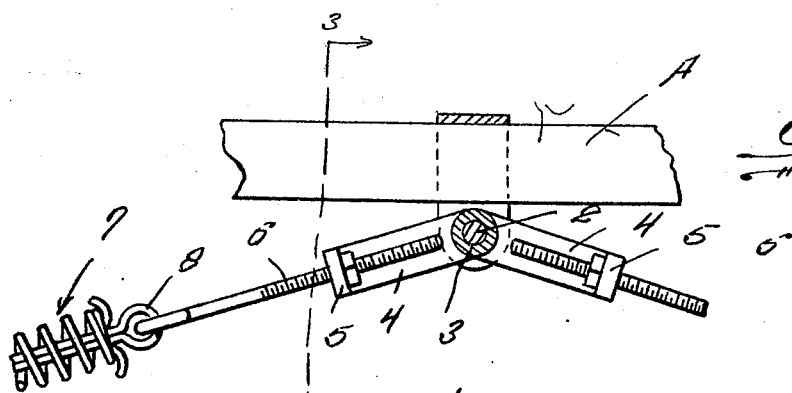
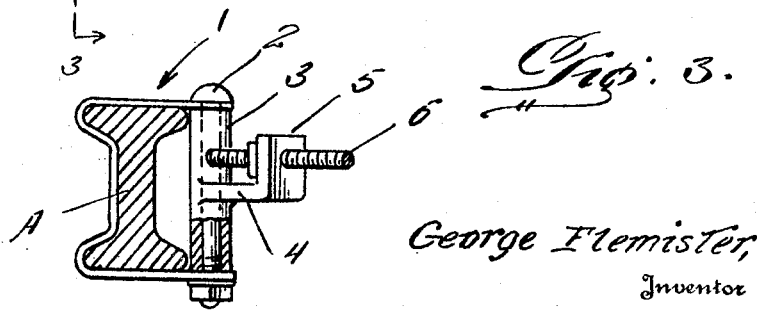

1,564,662

UNITED STATES PATENT OFFICE.

GEORGE FLEMISTER, OF ROME, GEORGIA.

STEERING-GEAR ATTACHMENT.

Application filed July 23, 1924. Serial No. 728,705.

*To all whom it may concern:*

Be it known that I, GEORGE FLEMISTER, a citizen of the United States, residing at Rome, in the county of Floyd and State of Georgia, have invented certain new and useful Improvements in a Steering-Gear Attachment, of which the following is a specification.

This invention relates to an improved attachment for an appliance which has been designed for use in conjunction with a conventional type of automobile steering gear.

It is my aim to provide a device of this kind which will function as an anti-rattler and which will decidedly aid in the steering operation by yieldably maintaining the front wheels in a straight line, but will permit them to be angled for making turns in the path of travel.

One feature of the invention is the novel clamp which I employ for connection to the front axle. A second feature is the adjustable connection between this clamp and the steering knuckles, this connection being readily adjustable and being yieldable for taking up lost motions and thus serving as an anti-rattler.

It is also a feature of the invention to provide a device of this kind which is comparatively simple, practical, strong and durable, and inexpensive to both the manufacturer and user.

Other features and advantages of the invention will become apparent from the following description and drawing:

In the accompanying drawing forming a part of this specification and in which like numerals are employed to designate like parts throughout the same:

Figure 1 represents a top plan view of a portion of a conventional steering gear showing the improved device associated therewith.

Figure 2 is an enlarged detail view of the axle clamp.

Figure 3 is a section taken substantially on the plane of the line 3—3 of Figure 2, a portion of one of the parts being broken away and shown in section.

For the purpose of enabling a clear comprehension of the invention to be obtained, I have illustrated the same applied to the automobile steering gear and by directing attention to Figure 1 it will be seen that, among other details, I have shown the axle A, the steering rod R with yokes B pivotally connected to the rearwardly extending knuckle arms J.

The improved device is attached directly to the yokes B and the axle A. It comprises an axle clamp which is generally referred to as 1. Although this clamp could be constructed otherwise, I prefer to use a substantially U-shaped metal strap which has its bight portion bent to conform to the shape of the axle as seen more clearly in Figure 3. The arms of the U extend beyond the rear side of the axle and are provided with openings for passage of a clamping bolt 2. An accurately proportioned sleeve 3 is interposed between said arms and the bolt extends through the sleeve. This sleeve carries a pair of rearwardly diverging horizontally disposed arms 4, the free ends of which are upturned as indicated at 5 and provided with holes. Between the clamp and the steering knuckle is a pair of connectors, each of which comprises a hook-bolt 6, the threaded end of which passes through one of the holes in the upturned ends 5. Each bolt is of course provided with a nut for adjusting it. Connected with the hooked end of the bolt is a longitudinally extensible spring retracted member 7 which in the present instance is made up of relatively slidable parts provided with eyes 8 and 9 respectively, these parts being surrounded by a coiled spring to resist relative sliding movement in one direction. A double ended hook 10 is connected at one end to the eye 9 and at its opposite end to the yoke B.

With the foregoing arrangement it is obvious that by attaching the clamps 1 to the approximate center of the axle A and by connecting the outer hooks of the members 10 with the yokes at the ends of the steering rod R, the spring of the connector will be relaxed. Thus, steering on a straight path of travel will not be interfered with. At the same time, excessive rattling of parts will be eliminated. Upon angling the wheels to make a turn in the path one or the other of the connectors, depending upon the direction of turn, will be extended under the action of the spring. Now, when the straight road is again reached, the steering wheel may simply be allowed, under the action of the spring to be automatically returned to a position for straight steering. If it is desired to adjust the connector, this can be done by the presence of the hook bolts 6 and special clamps.

It is thought that the foregoing description taken in connection with the accompanying drawings will suffice to enable persons skilled in the art to which the invention relates to obtain a clear understanding of the same. Therefore, a more lengthy description is deemed unnecessary.

Although I have shown and described the specific embodiment of the invention, it is to be understood that the minor changes coming within the scope of the adjoined claim may be resorted to if desired.

Having thus described the invention, what I claim is:—

A device of the class described comprising an axle clamp composed of a substantially U-shaped member adapted to be applied to the axle, a sleeve disposed between the free ends of the arms of said U-shaped member, said sleeve being provided with horizontal diverging arms having their free outer ends upturned and apertured, a clamping bolt passing through said arms and sleeve, and yieldable connectors connected to said upturned ends and having means at their outer ends for engagement with a portion of an automobile steering gear.

In testimony whereof I affix my signature.

GEORGE FLEMISTER.